US012773719B2

(12) United States Patent
Ishiguro

(10) Patent No.: US 12,773,719 B2
(45) Date of Patent: Oct. 27, 2026

(54) METHOD OF MANUFACTURING COAT BODY AND APPARATUS OF MANUFACTURING COAT BODY

(71) Applicant: THE JAPAN STEEL WORKS, LTD., Shinagawa-ku (JP)

(72) Inventor: Ryo Ishiguro, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 108 days.

(21) Appl. No.: 18/274,986

(22) PCT Filed: Sep. 6, 2021

(86) PCT No.: PCT/JP2021/032705
§ 371 (c)(1),
(2) Date: Jul. 28, 2023

(87) PCT Pub. No.: WO2022/162993
PCT Pub. Date: Aug. 4, 2022

(65) Prior Publication Data
US 2024/0100562 A1 Mar. 28, 2024

(30) Foreign Application Priority Data
Jan. 29, 2021 (JP) ................................ 2021-012812

(51) Int. Cl.
*B05B 5/14* (2006.01)
*B05B 5/025* (2006.01)
(Continued)

(52) U.S. Cl.
CPC ................ *B05D 1/36* (2013.01); *B05B 5/025* (2013.01); *B05B 5/14* (2013.01); *B05B 12/18* (2018.02);
(Continued)

(58) Field of Classification Search
None
See application file for complete search history.

(56) References Cited

U.S. PATENT DOCUMENTS 3,509,851 A * 5/1970 Barnes ................ B27G 11/005 118/316
4,270,317 A * 6/1981 Kurie ..................... C23G 3/026 451/89
(Continued)

FOREIGN PATENT DOCUMENTS

CN 105944920 A 9/2016
DE 19707157 B4 4/2006
(Continued)

OTHER PUBLICATIONS

Extended European Search Report and European Search Opinion issued Nov. 27, 2024, in European Patent Application No. 21923001.8.

(Continued)

*Primary Examiner* — Binu Thomas
(74) *Attorney, Agent, or Firm* — Potomac Law Group, PLLC

(57) ABSTRACT

A coat body with satisfactory properties is manufactured. A coat body 5 is manufactured by a step (a) of forming a first coat liquid layer 3a by applying a first coat liquid onto a first surface of a base member 1 loaded out from a carry-out unit, a step (b) after the step (a), of forming a second coat liquid layer 4a by applying a second coat liquid onto the first coat liquid layer, a step (c) after the step (b), of forming a coat layer 3a and a coat layer 4b by drying the first coat liquid layer and the second coat liquid layer, and a step (d) of loading in the base member including the coat layer 3b and the coat layer 4b formed thereon by a carry-in unit. And, in the step (a), the first coat liquid is applied onto the first
(Continued)

surface of the base member. In the step (b), the second coat liquid is atomized onto the first surface of the base member.

7 Claims, 14 Drawing Sheets

(51) Int. Cl.

| | |
|---|---|
| ***B05B 12/18*** | (2018.01) |
| ***B05C 1/08*** | (2006.01) |
| ***B05C 9/06*** | (2006.01) |
| ***B05C 9/14*** | (2006.01) |
| ***B05C 11/06*** | (2006.01) |
| ***B05D 1/06*** | (2006.01) |
| ***B05D 1/36*** | (2006.01) |
| ***H01M 4/04*** | (2006.01) |

(52) U.S. Cl.

CPC ................ *B05C 9/06* (2013.01); *B05C 11/06* (2013.01); *B05D 1/06* (2013.01); *H01M 4/0404* (2013.01); *B05B 5/0255* (2013.01); *B05C 1/08* (2013.01); *B05C 1/0826* (2013.01); *B05C 9/14* (2013.01)

(56) References Cited

U.S. PATENT DOCUMENTS

| | | | | |
|---|---|---|---|---|
| 5,118,357 | A * | 6/1992 | Sabatka | B08B 3/022 134/102.1 |
| 5,282,485 | A * | 2/1994 | Hirai | B08B 3/022 134/122 R |
| 2004/0074440 | A1 * | 4/2004 | Nissinen | B05B 12/18 118/313 |
| 2004/0126490 | A1 | 7/2004 | Aichholzer et al. | |
| 2007/0190253 | A1 | 8/2007 | Matsunaga | |
| 2010/0058609 | A1 * | 3/2010 | Taguchi | F26B 13/10 34/443 |
| 2016/0020454 | A1 * | 1/2016 | Wang | B05B 5/0255 427/458 |
| 2018/0149902 | A1 * | 5/2018 | Lee | B05D 1/02 |
| 2022/0045309 | A1 * | 2/2022 | Min | B05C 1/0808 |

FOREIGN PATENT DOCUMENTS

| | | | |
|---|---|---|---|
| JP | H07-051616 | A | 2/1995 |
| JP | 2004-136286 | A | 5/2004 |
| JP | 2004-329996 | A | 11/2004 |
| JP | 2004-351413 | A | 12/2004 |
| JP | 2016-059892 | A | 4/2016 |
| JP | 2016-115577 | A | 6/2016 |
| JP | 2016-183209 | A | 10/2016 |
| JP | 2019-072666 | A | 5/2019 |
| KR | 10-2015-0132418 | | 11/2015 |
| KR | 101953804 | B1 | 3/2019 |
| WO | WO 2002/072953 | A1 | 9/2002 |
| WO | WO 2014/149898 | A1 | 9/2014 |

OTHER PUBLICATIONS

Office Action issued Dec. 27, 2024, in Taiwanese Patent Application No. 110133522.

International Search Report for International Patent Application No. PCT/JP2021/032705, Oct. 26, 2021.

Office Action issued Feb. 6, 2024, in Japanese Patent Application No. 2021-012812.

Office Action issued Apr. 18, 2025, in Chinese Patent Application No. 202180087792.9.

Office Action issued Mar. 4, 2026, in Korean Patent Application No. 10-2023-7025270.

* cited by examiner

METHOD OF MANUFACTURING COAT BODY AND APPARATUS OF MANUFACTURING COAT BODY

TECHNICAL FIELD

The present invention relates to a method of manufacturing a coat body and an apparatus of manufacturing the coat body, and, more particularly relates to a method of manufacturing a coat body used for a separator of a battery (cell) and an apparatus of manufacturing the coat body.

BACKGROUND

In recent years, batteries such as lithium ion battery have been actively used for automobiles and infrastructures. In the battery such as lithium ion battery, a positive electrode member and a negative electrode member are separated by a porous film called a separator. The separator has, for example, a plurality of fine pores allowing lithium ions to pass therethrough, and charging and discharging can be repeated by movement of the lithium ions between the positive electrode member and the negative electrode member through the pores. Thus, the separator has a role of separating the positive electrode member and the negative electrode member to prevent short-circuit.

When the inside of the battery becomes a high temperature for some reason, the movement of lithium ions is stopped by closing the fine pores of the separator, and the battery function is stopped (shutdown function).

Therefore, the separator has a role of a safety device of the battery, and it is important to enhance mechanical strength and heat resistance of the separator.

For example, Patent Document 1 (Japanese Patent Application Laid-Open Publication No. 2016-183209) discloses a technique of forming a covering layer containing inorganic particles and binder resin composition on at least one side of a polyolefin resin porous film.

Furthermore, Patent Document 2 (Japanese Patent Application Laid-Open Publication No. 2019-72666) discloses a coating apparatus configured to suppress a plurality of coat liquids from mixing with each other, the coating apparatus including: a first die forming a first layer by ejecting a first coat liquid from a first ejection port to apply the first coat liquid onto a sheet being in contact with a backup roll; and a second die forming a second layer by ejecting a second coat liquid from a second ejection port to apply the second coat liquid onto the first layer on the sheet being in contact with the backup roll.

RELATED ART DOCUMENTS

Patent Documents

Patent Document 1: Japanese Patent Application Laid-Open Publication No. 2016-183209

Patent Document 2: Japanese Patent Application Laid-Open Publication No. 2019-72666

SUMMARY

Problems to be Solved by the Invention

The inventors of the present invention have conducted researches and developments on a coating technique of forming a coat layer on a surface of a base member in order to enhance the properties of the coat body such as the separator of the battery.

In the course of researches and developments, a case of use of multiple layers as the coat layer causes the mixing problem in the coat liquid. A satisfactory coating technique has been revealed by intensive studying to resolve such a problem.

Other problems and novel characteristics will be apparent from the description of the present specification and the accompanying drawings.

Means For Solving The Problems

A method of manufacturing a coat body disclosed in the present application includes: a step (a) of forming a first coat liquid layer by applying a first coat liquid onto a first surface of a base member taken out from a carry-out unit; a step (b) of forming a second coat liquid layer by applying a second coat liquid onto the first coat liquid layer after the step (a); a step (c) of forming a first coat layer and a second coat layer by drying the first coat liquid layer and the second coat liquid layer after the step (b); and a step (d) of loading in the base member including the first coat layer and the second coat layer formed thereon by a carry-in unit. In the step (a), the first coat liquid is applied onto the first surface of the base member. In the step (b), the second coat liquid is atomized onto the first surface of the base member.

An apparatus of manufacturing a coat body disclosed in the present application includes: a carry-out unit configured to load out a base member; a first coating unit configured to apply a first coat liquid onto a first surface of the base member; a second coating unit configured to apply a second coat liquid onto the first surface of the base member; a dryer configured to form a coat body on the first surface of the base member by drying the first coat liquid and the second coat liquid on the base member; and a carry-in unit configured to load in the base member including the coat body formed thereon. The first coating unit applies the first coat liquid on the first surface of the base member, and the second coating unit atomizes the second coat liquid onto the first surface of the base member.

Effects of the Invention

According to the method of manufacturing the coat body disclosed in the present application, a coat body having satisfactory properties can be manufactured.

According to the apparatus of manufacturing the coat body disclosed in the present application, a coat body having satisfactory properties can be manufactured.

BRIEF DESCRIPTIONS OF THE DRAWINGS

DETAILED DESCRIPTION OF PREFERRED EMBODIMENTS

Hereinafter, embodiments will be described in detail based on examples and drawings. Note that components having the same function are denoted by the same reference signs throughout all the drawings for describing the embodiments, and the repetitive description thereof will be omitted.

First Embodiment

FIG. 1 is a cross-sectional view illustrating a step of manufacturing a coat body of the present embodiment. FIG. 2 is a view schematically illustrating a configuration of an apparatus of manufacturing the coat body of the present embodiment.

First, a step of forming the coat body will be described with reference to FIG. 1.

Figure 1A:
FIG. 1 is a cross-sectional view illustrating a step of manufacturing a coat body of a first embodiment.
Figure 2:
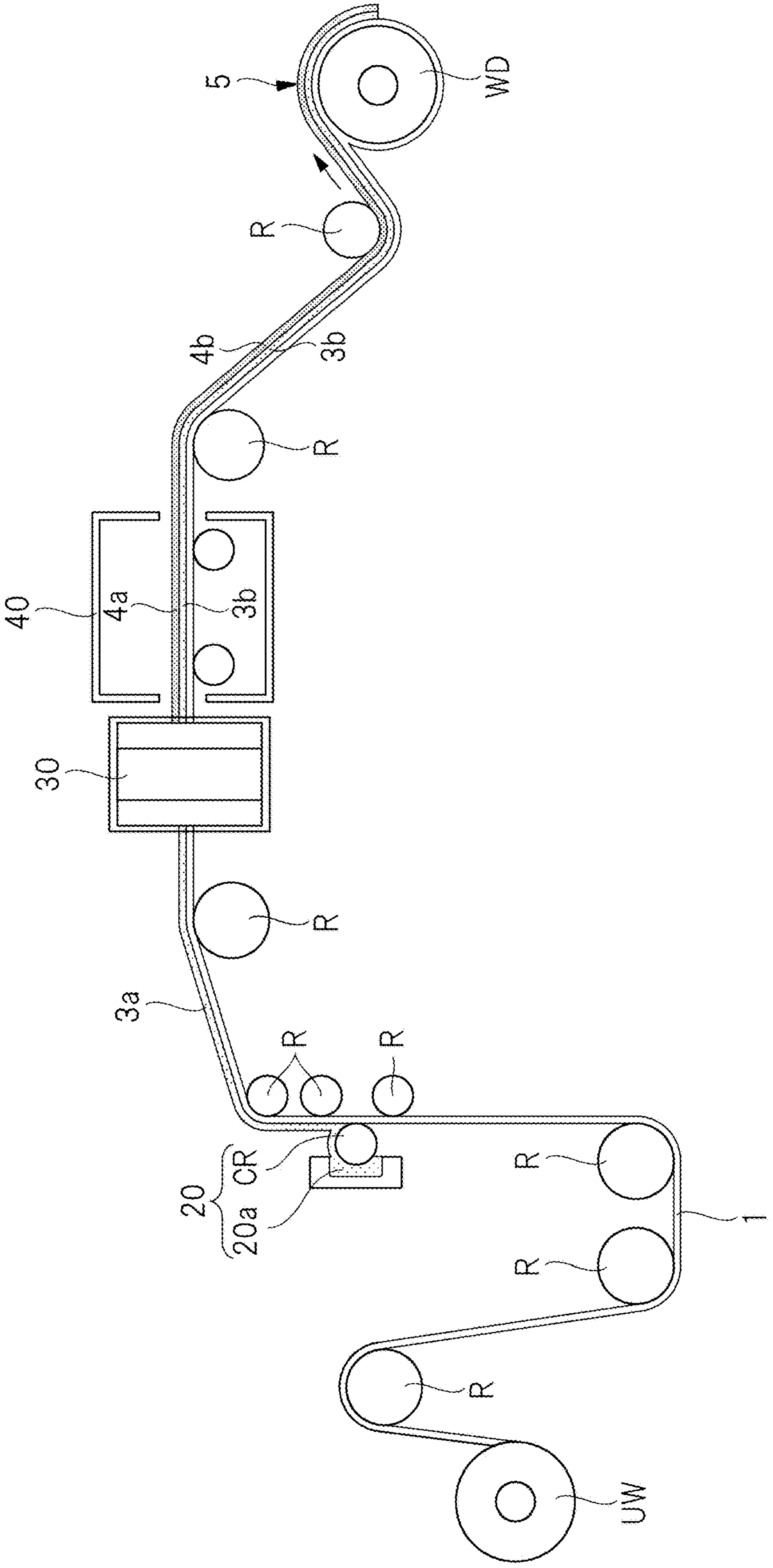
FIG. 2 is a view schematically illustrating a configuration of an apparatus of manufacturing the coat body of the first embodiment.

As illustrated in FIG. 1(A), a base member 1 made of a porous film is prepared. The porous film which is the base material 1 is made of, for example, polyolefin-based resin. The thickness of the base member 1 is, for example, about 5 μm to 50 μm, and the width of the same is, for example, about 100 mm to 3000 mm. The pore diameter distribution of the fine pores is, for example, about 10 nm to 10 μm, and an average pore diameter is, for example, about 10 nm to 900 nm. Furthermore, a Gurley number of the base member 1 is, for example, about 100 to 300 sec/100 cc.

Figure 1B:
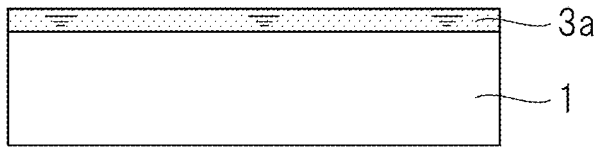

Next, as illustrated in FIG. 1(B), the first coat liquid is applied onto the surface of the base member 1 to form a first coat liquid layer 3*a*. The first coat liquid includes a filler and a dispersant. Examples of a filler is alumina, silica, aluminum hydroxide, an inorganic substance such as boehmite, cellulose (including cellulose nano fiber), carbon fiber, carbon nano tube, carbon nano fiber, graphene, fullerene, aramid fiber and the like. A cellulose, a hydrophilic group of which is replaced with a hydrophobic group, may be used as the cellulose. As the dispersant, water-based solvent or organic-based solvent can be used. Furthermore, a binder may be added. As the binder, side chain or annular polymer resin or acryl resin, thermoplastic fluorine polymer, and the like can be used. As the application apparatus, for example, a gravure coating apparatus can be used. Furthermore, a state with addition of styrene/butadiene rubber (SBR) or polymer having high ion conductivity in addition to the filler and the binder may be used.

Figure 1C:
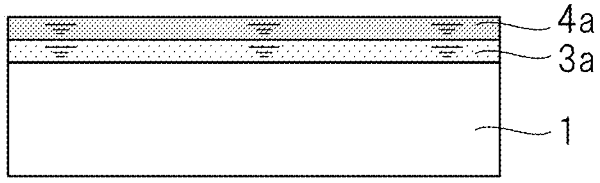

Next, as illustrated in FIG. 1(C), the second coat liquid is applied onto the surface of the base member 1 to form the second coat liquid layer 4*a*. The second coat liquid contains water glass and solvent. The water glass is aqueous solution of silicate of alkali metal or alkaline earth metal. For example, not only sodium silicate ($Na_2O.nSiO_2$ (n=2 to 4)) but also silicate (alkali silicate) containing Li, K, Rb, Ba, Ca, Mg, Sr and the like in place of Na can be used, single use of one type of them may be used, or combination use of two or more types may be used. As the solvent, water-based solvent or organic-based solvent can be used. Furthermore, a binder may be added. As the binder, resin (fluorine resin) such as PVdF (polyvinylidene fluoride) may be used.

Figure 1D:
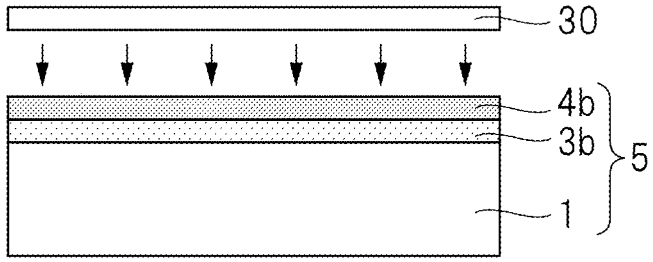

Next, as illustrated in FIG. 1(D), the first coat liquid layer 3*a* and the second coat liquid layer 4*a* on the base member 1 are dried by a heater 10 or the like to form a stacked film of a coat film 3*b* and a coat film 4*b*. Through the above steps, a coat body (separator) 5 made of the base member (porous film) 1, the coat film 3*b* and the coat film 4*b* can be formed. The coat film 3*b* and the coat film 4*b* have air permeability, and the Gurley number of the coat body 5 (gas permeability, [sec/100cc]) is equal to or larger than 10 and equal to or smaller than 300, and the gas permeability is secured.

A case where the coat layer is formed by using the apparatus (system) illustrated in FIG. 2 will be described below.

As illustrated in FIG. 2, the apparatus of manufacturing the coat body includes: an unwinder (carry-out unit) UW that unwinds the base member 1; and a winder WD that winds the base member 1. The base member 1 is continuously arranged from the unwinder UW to the winder WD, and the coat film 3*b* and the coat film 4*b* are formed on the surface (first surface) of the base member 1 between the unwinder UW and the winder WD to complete the coat body 5. According to the apparatus of manufacturing the coat body, the base member 1 in a wound form (wound belt form) can be continuously processed, and the coat body can be efficiently formed. In the present specification, note that the unwinder UW may be referred to as upstream while the winder (carry-in unit) WD may be referred to as downstream.

Specifically, a first coating processing unit (20), a second coating processing unit (30), and a dryer (40) are arranged between the unwinder UW and the winder WD. The base member 1 is processed at each processing unit while being guided by a plurality of rolls (guide rolls) R, and the coat film 3*b* and the coat film 4*b* are formed on the surface thereof. Details will be described below.

The base member 1 unwound from the unwinder UW is guided by the roll R, and is conveyed to the first coating processing unit (20). In the first coating processing unit (20), a gravure coating apparatus is arranged, and the first coat liquid is applied on (is processed to coat) the first surface of the base member 1 to form a first coat liquid layer 3*a*.

The base member 1 including the first coat liquid layer 3*a* formed thereon is guided by the roll R, and is conveyed to the second coating processing unit (30). In the second coating processing unit (30), a spray coating apparatus is arranged, and the second coat liquid is applied on (is processed to coat) the first coat liquid layer 3*a* of the first surface of the base member 1 to form a second coat liquid layer 4*a*.

The base member 1 including the first coat liquid layer 3*a* and the second coat liquid layer 4*a* formed thereon is conveyed to the dryer (40). In the dryer (40), a drying furnace (conveyor drying furnace) 40 is arranged, and the liquid component of the first coat liquid layer 3*a* and the second coat liquid layer 4*a* of the base member 1 conveyed by the roll R is vaporized to form the coat film 3*b* and the coat film 4*b*. For example, the drying furnace includes a drying chamber (cover), and heated air is introduced into the drying chamber from a nozzle not illustrated. The temperature of the heated air is controlled by a heating unit (heater, etc.) not illustrated.

Thus, the belt-shaped base member 1 is processed in each processing unit while being guided by the plurality of rolls (guide rolls) R, and the coat body 5 is formed.

Here, in the present embodiment, the gravure coating apparatus, which is a contact coating process, is used in the first coating processing unit (20), and the spray coating apparatus, which is a non-contact coating process, is used in the second coating processing unit (30), and therefore, the first coat liquid layer 3*a* and the second coat liquid layer 4*a* can be formed with satisfactory accuracy.

Figure 3:
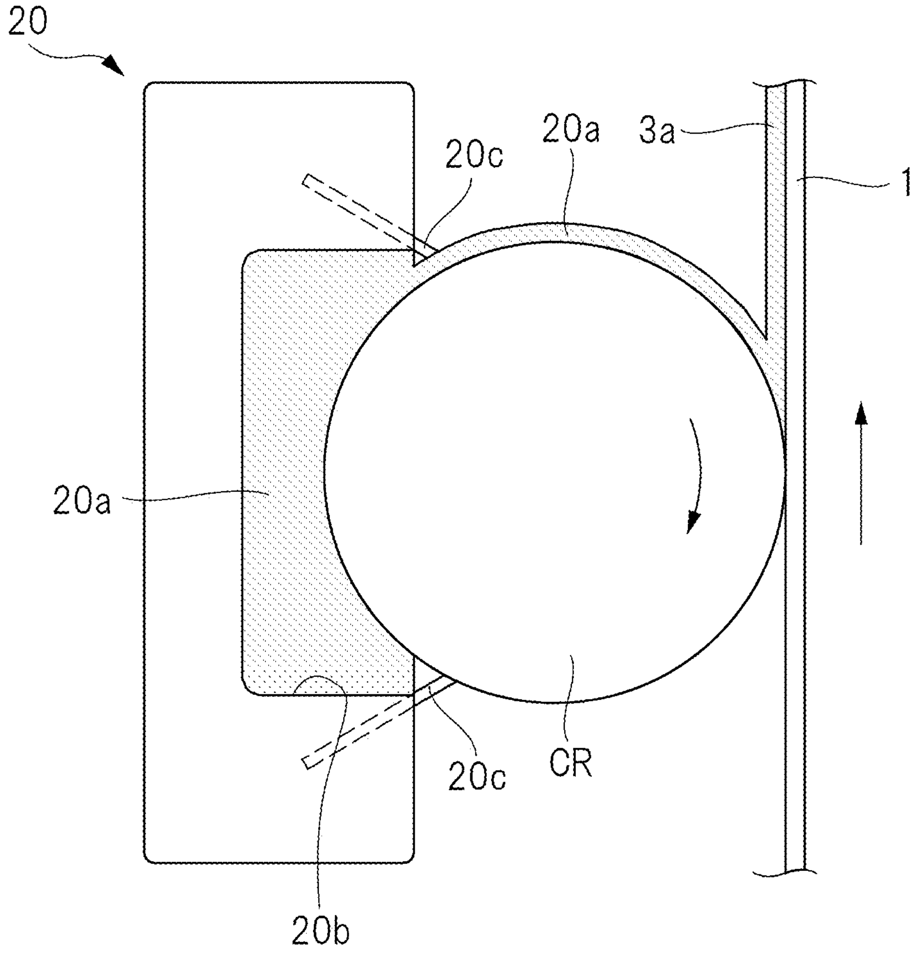
FIG. 3 is a cross-sectional view illustrating a gravure coating apparatus.

FIG. 3 is a cross-sectional view illustrating the gravure coating apparatus. The gravure coating apparatus illustrated in FIG. 3 is a vertical type coating apparatus, where a chamber (bath) 20*b* is arranged in a perpendicular direction (direction parallel to direction of gravitational force). This apparatus includes: a chamber (bath) 20*b* for storing the coat liquid 20*a*; a coating roll (gravure roll) CR one part of which being soaked in the chamber (bath) 20*b*; a first blade 20*c* for preventing splashing of the coat liquid 20*a* and adjusting the liquid amount on the surface of the roll; and a second blade 20*c* for preventing leakage of the coat liquid in the chamber (bath) 20*b* and the coat liquid from the gap of the coating roll (gravure roll). The first blade 20*c* is arranged in the rotation direction side of the coating roll CR so that the angle and pressing pressure of the first blade 20*c* can be adjusted to adjust the liquid amount of the coat liquid 20*a* attached to the surface of the coating roll CR. The first coat liquid layer 3*a* is formed by transferring the coat liquid 20*a* attached to the surface of the coating roll CR onto the surface of the base member 1. The gravure coating apparatus illustrated in FIG. 3 may be a vertical type or may be a horizontal type. In the case of the horizontal type, the second blade for preventing leakage of the coat liquid is not necessary, and only the first blade 20*c* for preventing splashing of the coat liquid 20*a* and adjusting the liquid amount on the surface of the roll is provided.

Figure 4:
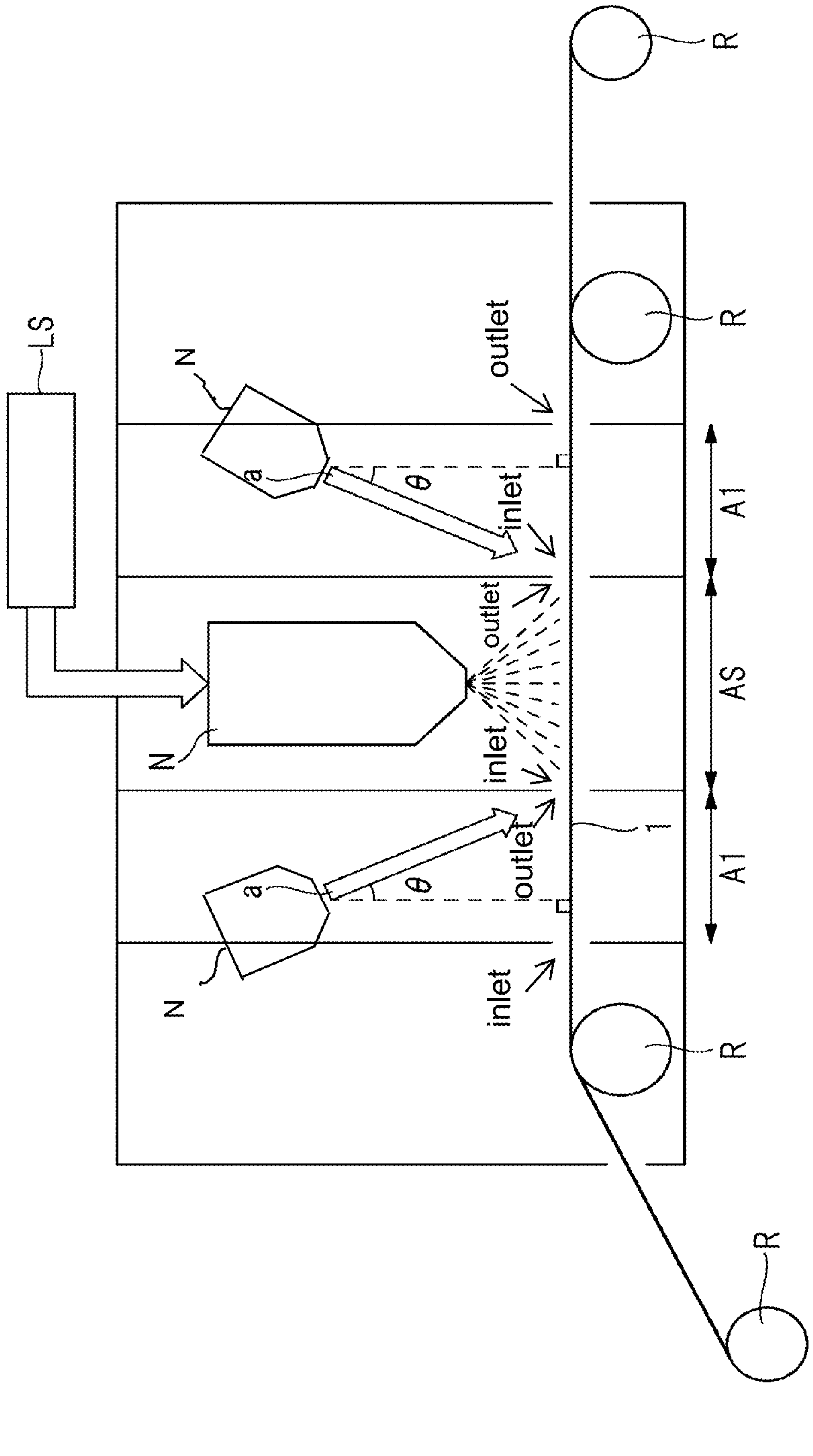
FIG. 4 is a cross-sectional view illustrating a spray-coating apparatus.
Figure 5:
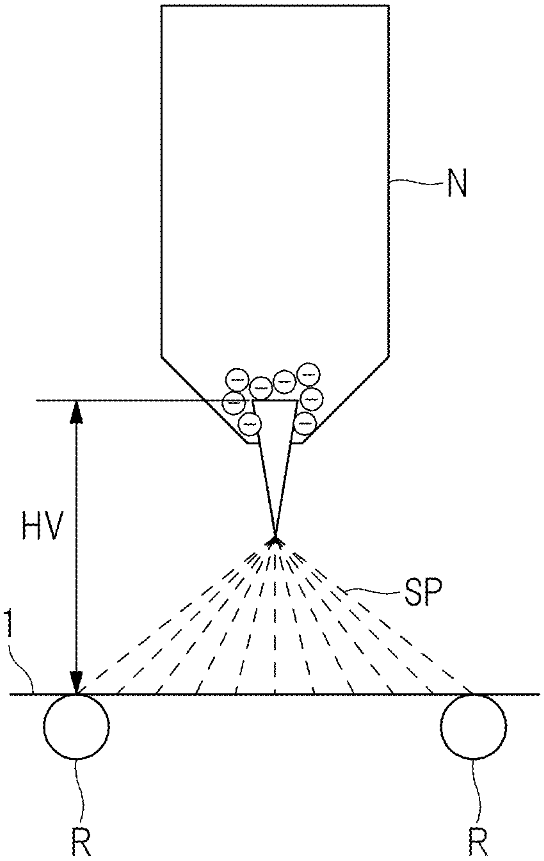
FIG. 5 is a cross-sectional view illustrating the spray-coating apparatus.

FIGS. 4 and 5 are cross-sectional views each illustrating the spray coating apparatus. The spray coating apparatus illustrated in FIGS. 4 and 5 is a solution applying apparatus using an electro-spraying phenomenon.

As illustrated in FIG. 4, the spray coating apparatus atomizes the second coat liquid supplied from the liquid supply apparatus LS, together with gas, from a nozzle N onto the base member 1 (first coat liquid layer 3*a*). The nozzle N extends in, for example, the depth direction of the drawing sheet, and the nozzle hole has a rectangular shape having a long side in the depth direction of the drawing sheet. For the gas, one or more types of gas selected from inert gas, oxygen, and air can be used. The moisture content (humidity) of the gas is preferably 0 to 90%.

Here, as illustrated in FIG. 5, high voltage HV is applied between the nozzle N and the base member 1. Note that the high voltage HV may be applied to, in place of the base member 1, a portion between the nozzle N and the roller R in contact with the base member 1 or a conveying belt (not illustrated) arranged between the base member 1 and the roller R. Thus, when high voltage HV (1 kV or higher) is applied, a strong electric field is generated at the tip of the nozzle, and the surface of the solution at the tip of the nozzle is charged. Thus, a conical meniscus called Taylor-cone is formed by the interaction between the charge of the surface of the solution and the electric field. When the electric field is further enhanced, the electrostatic repulsion on the liquid surface becomes larger than the surface tension, and micro-liquid droplets are ejected from the tip of the Taylor-cone. In such micro-liquid droplets, the solvent is evaporated in a short time, and the charge density of the liquid droplets is increased. As a result, electrostatic fission is caused in the liquid droplets to accelerate the micronization of the liquid droplets and to adhere the liquid droplets onto the facing base member 1 (electrode), and thus, the second coat liquid layer 4*a*. For example, the diameter of the liquid droplet on the coated surface is 0.01 to 60 μm.

Thus, the second coat liquid layer 4*a* can be formed uniformly and with satisfactory controllability by using the spray coating apparatus that utilizes the electro-spraying phenomenon.

Figure 6:
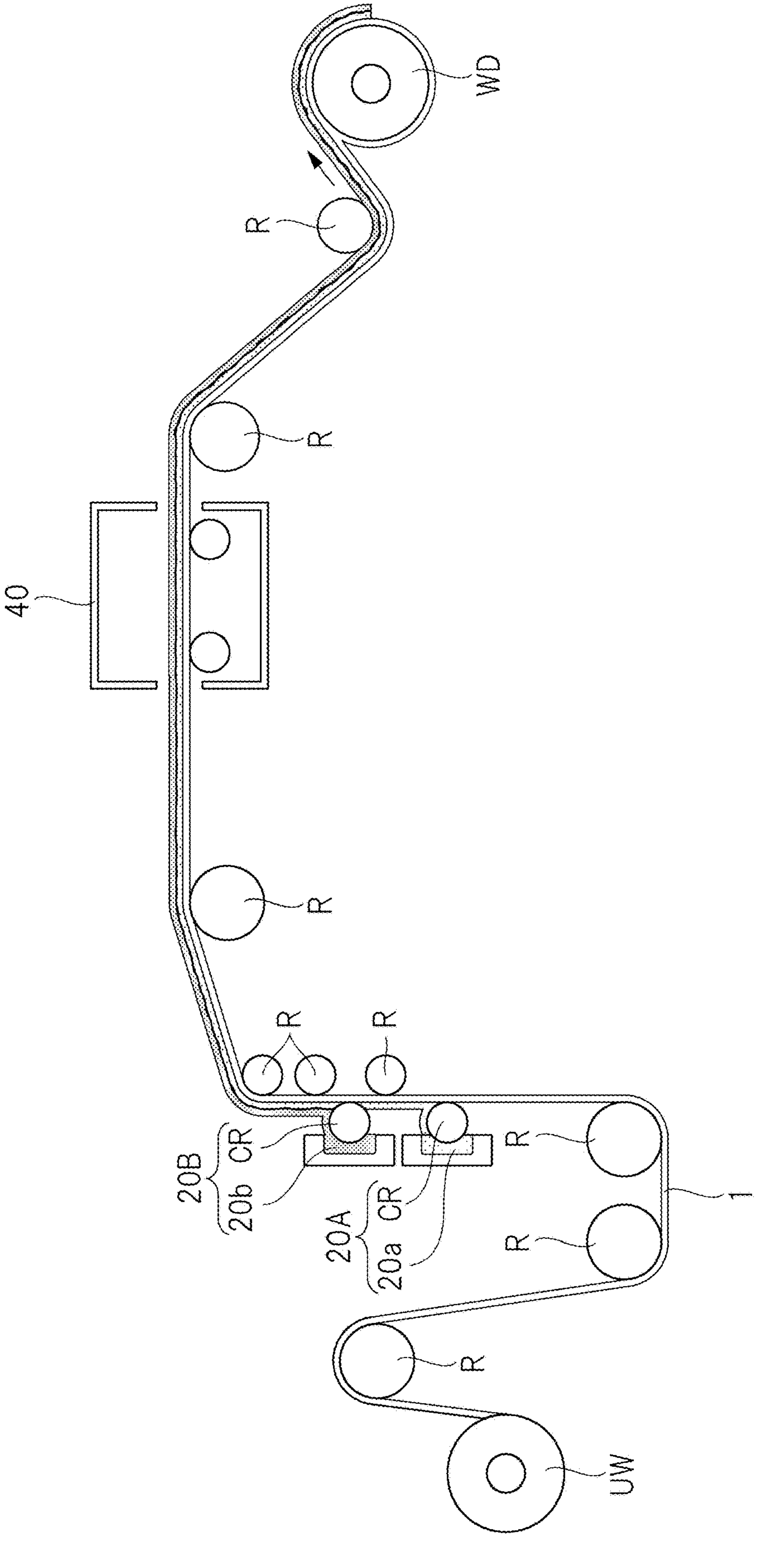
FIG. 6 is a view schematically illustrating a configuration of an apparatus of manufacturing a coat body of a comparative example.

FIG. 6 is a view schematically illustrating a configuration of an apparatus of manufacturing a coat body according to a comparative example. As illustrated in FIG. 6, the first coat liquid layer 3*a* and the second coat liquid layer 4*a* can be formed by using the coating apparatus including two gravure coating units (20A, 20B). However, since the gravure coating is the contact coating process, and thus, the roll CR at the time of the application of the second coat liquid comes into contact with the first coat liquid layer 3*a* to disorder the first coat liquid layer 3*a*, and to possibly form a mixed layer of undesired coat liquids.

Figure 7:
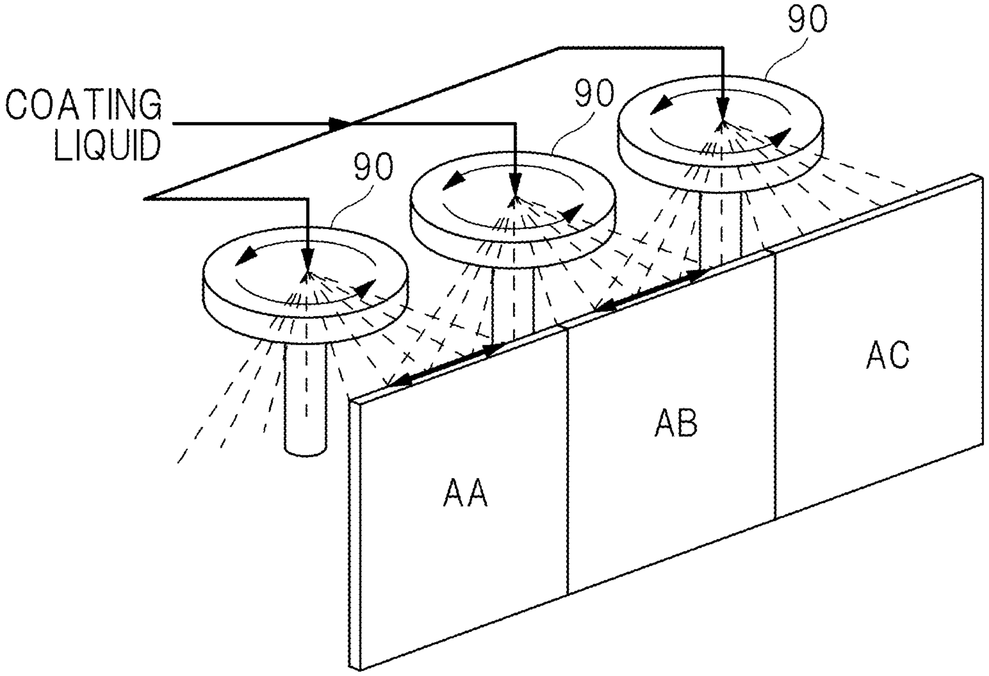
FIG. 7 is a view illustrating a configuration of the apparatus of manufacturing the coat body of the comparative example.

FIG. 7 is a view schematically illustrating a configuration of the apparatus of manufacturing the coat body according to the comparative example. As a coating apparatus capable of performing the non-contact coating process, a coating apparatus using a rotary disc (rotor) 90 as illustrated in FIG. 7 can be used. In this case, however, it is difficult to control a plurality of rotary discs and difficult to control the micronization of the liquid droplets, and it is difficult to form the coat liquid layer with satisfactory controllability.

On the other hand, in the present embodiment, the second coat liquid layer 4*a* can be formed uniformly and with satisfactory controllability by using the spray coating apparatus that utilizes the electro-spraying phenomenon for the post-stage coating apparatus. For example, the thin (layer having a film thickness of about 0.01 to 10 μm) second coat liquid layer 4*a* can be also formed.

Furthermore, the spray coating apparatus of the present embodiment illustrated in FIG. 4 includes an atomization area AS in which the ultra-micro liquid droplets (mist) are atomized, an air curtain area A1 located in the upstream of the atomization area AS, and an air curtain area A1 located in the downstream of the atomization area AS. In the air curtain area A1, air is sprayed in a direction “a” of the atomization area AS (nozzle N). In other words, an air nozzle inclined in the direction of the atomization area AS (nozzle N) is arranged, and air is sprayed in the direction of the atomization area AS through the air nozzle. The angle (θ) between the perpendicular direction of the base member 1 and the direction “a”, that is, the angle (θ) between the perpendicular direction of the base member 1 and the nozzle is equal to or larger than 0.1° and equal to or smaller than 90°. In still other words, the angle (θ) between the arranging direction (perpendicular direction) of the nozzle N and the inclining direction of the air nozzle is equal to or larger than 0.1° and equal to or smaller than 90°. The amounts of accompanying flow flowing into the air curtain area A1 located in the upstream of the atomization area AS, accompanying flow flowing into the atomization area AS, and accompanying flow flowing into the air curtain area A1 located in the downstream of the atomization area AS are changed by change in conveyance speed of the substrate 1, and thus it is desirable that the tip position of the air nozzle and the angle (θ) of the nozzle can be optionally changed.

Therefore, leakage of mist to the upstream side and the downstream side of the atomization area AS can be suppressed by the air curtain areas A1. In particular, the base member 1 is conveyed through the opening (window, gap, base member inlet, base member outlet) provided on the lower side of the wall partitioning each area (each chamber A1, AS, A1). By this conveyance, an accompanying flow which is a wind flowing in the conveying direction (traveling direction) of the base member 1 is generated. Since the mist leaks while being on the accompanying flow, it is particularly preferable to form the air curtain area A1 on the downstream side of the atomization area AS.

As described above, in the apparatus illustrated in FIG. 5, note that the air curtain area A1 is provided on the upstream side and the downstream side of the atomization area AS, but may be provided only on the downstream side. Furthermore, in the apparatus illustrated in FIG. 5, the air spray direction is diagonal, but may be perpendicular (θ=90°) with respect to the substrate 1.

Second Embodiment

In the present embodiment, an application example of the apparatus of manufacturing the coat body according to the first embodiment will be described.

First Application Example

Figure 8:
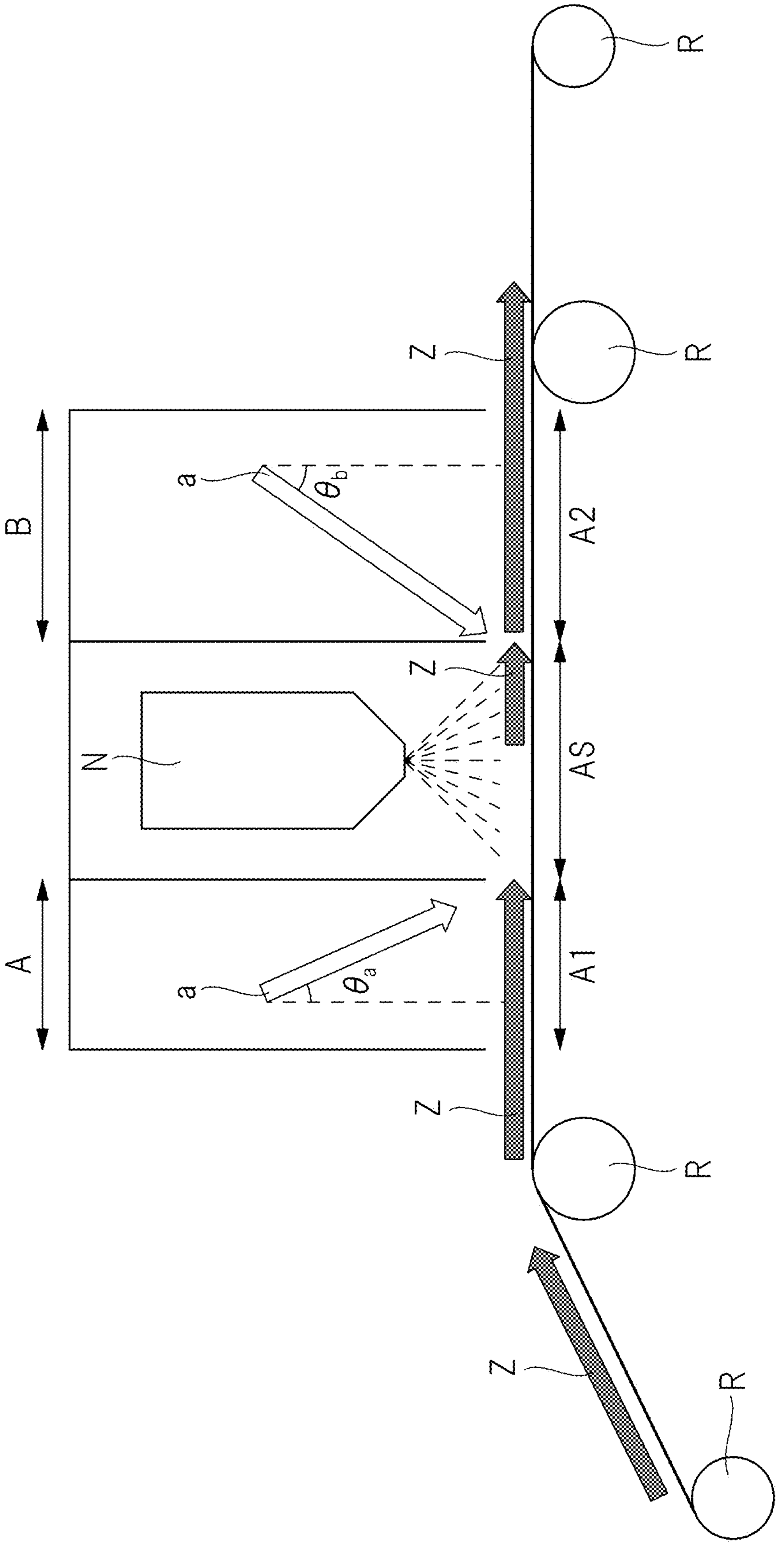
FIG. 8 is a cross-sectional view illustrating a spray-coating apparatus of a first application example.
Figure 9:
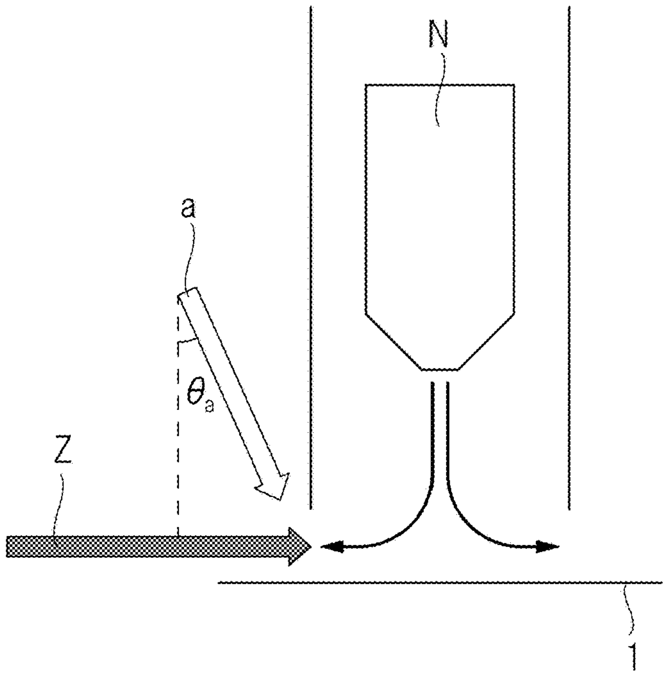
FIG. 9 is a cross-sectional view illustrating the spray-coating apparatus of the first application example.
Figure 10:
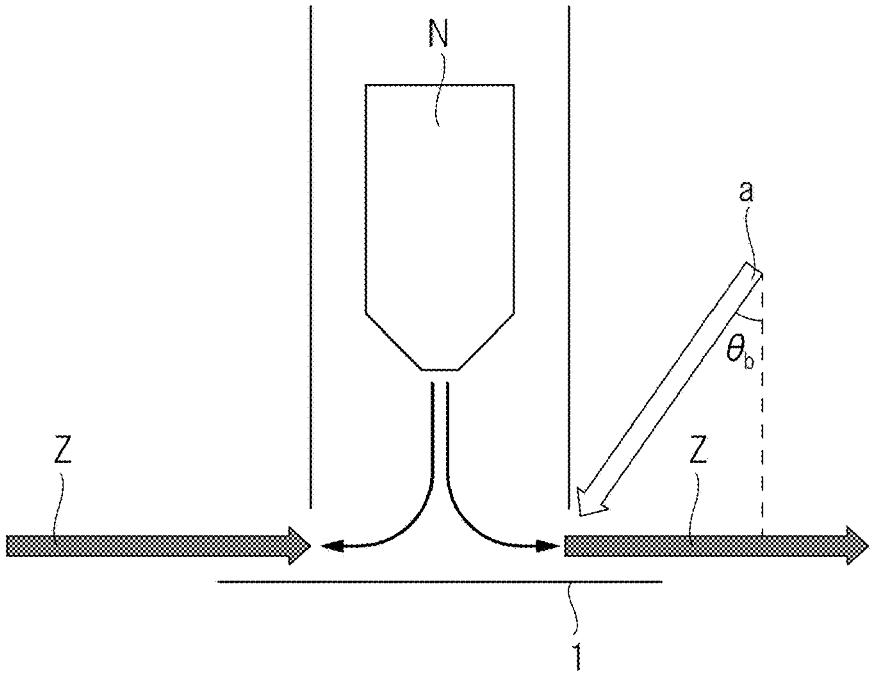
FIG. 10 is a cross-sectional view illustrating the spray-coating apparatus of the first application example.

FIGS. 8 to 10 are cross-sectional views each illustrating a spray coating apparatus of the present application example. A term "Z" indicates the accompanying flow, and FIG. 9 illustrates the upstream side while FIG. 10 illustrates the downstream side. In the first embodiment (FIG. 5), the air spray directions of the air curtain areas A1 on the upstream side and the downstream side of the atomization area AS are symmetrical (have the same angle θ) to each other. However, as illustrated in FIGS. 8 to 10, the air spray angle θb on the downstream side may be made larger than the air spray angle θa on the upstream side (θb>θa).

Thus, the leakage preventing effect on the downstream side where the mist is easily leaked out by the accompanying flow Z can be enhanced by increasing the air spray angle θb on the downstream side.

Furthermore, when the air spray angles (θa and θb) on the upstream side and the downstream side are adjusted as described above, the air nozzle can be easily inclined by making the length B of the air curtain area A1 on the downstream side among the lengths (A, B) of the air curtain areas A1 in the conveying direction of the base member 1 larger than the length A of the air curtain area A1 on the upstream side (B>A).

Second Application Example

The flow amount of the air nozzle may be increased in the air curtain area A1 on the downstream side susceptible to the influence of the accompanying flow. The flow amount is defined as an air amount ($m^3$/min) to be moved per unit time in a case of use of a blower or the like. For example, the flow amount of the air nozzle of the air curtain area A1 on the downstream side may be made larger than the flow amount of the air nozzle of the air curtain area A1 on the upstream side.

Third Application Example

The number of air nozzles may be increased in the air curtain area A1 on the downstream side susceptible to the influence of the accompanying flow. For example, in the air curtain area A1 on the downstream side, a plurality of air nozzles may be arranged in the depth direction of the drawing sheet of FIG. 4, and the number of them may be larger than the number of air nozzles in the air curtain area A1 on the upstream side. In this case, if the flow amount per one air nozzle is the same, the flow amount of the air nozzle of the air curtain area A1 on the downstream side is made larger than the flow amount of the air nozzle of the air curtain area A1 on the upstream side.

Note that the plurality of air nozzles are referred to as an air nozzle group. The plurality of air nozzles of the air nozzle group are lined in a direction, for example, perpendicular to the conveying direction. Furthermore, the blower used for the air nozzle group may be one blower (having the same flow amount among all nozzles) for the plurality of nozzles. Alternatively, a system of connecting one blower to one nozzle may be used. In this case, the flow amount can be changed for each nozzle, and the outflow of the accompanying flow can be further suppressed.

Third Embodiment

In the present embodiment, an application example of the coat body described in the first embodiment will be described. The coat body formed by using the apparatus of manufacturing the coat body described in the first embodiment can be applied to, for example, a lithium ion battery as a separator.

Figure 11:
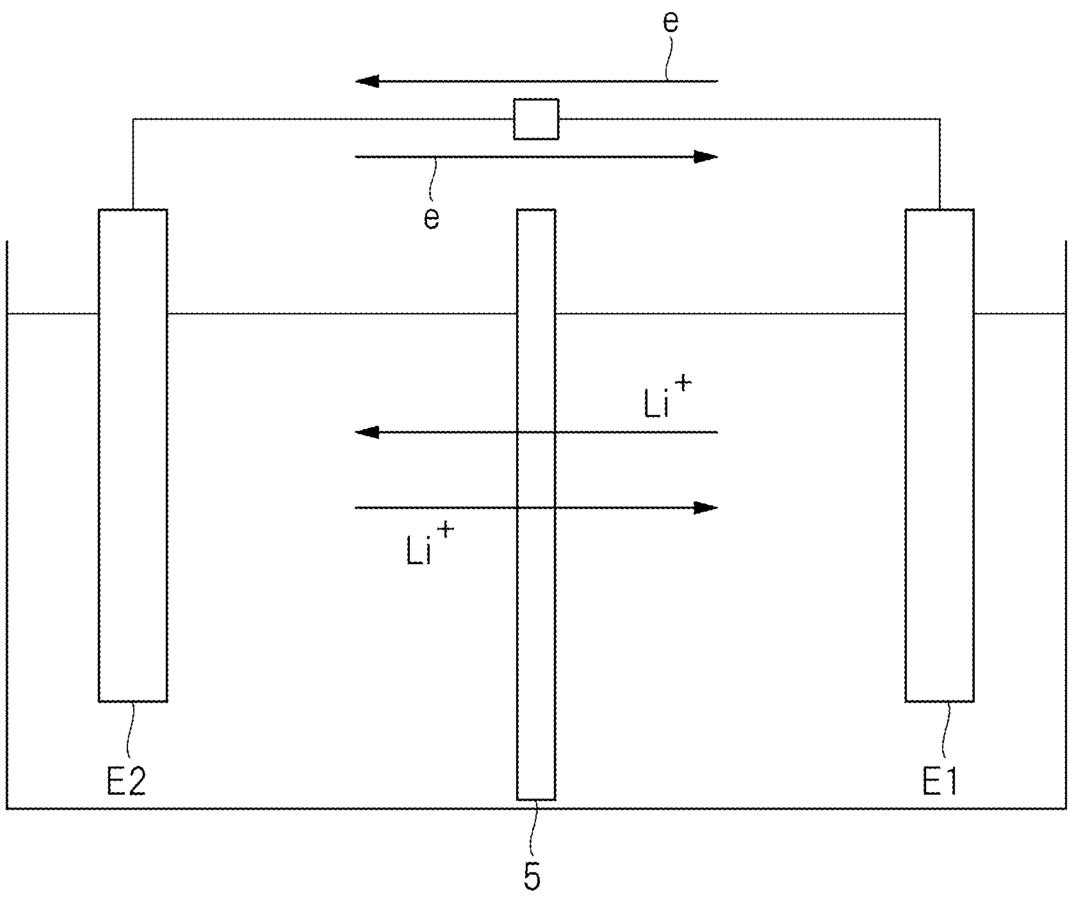
FIG. 11 is a view illustrating a relationship between movement of lithium ions ($Li^+$) and charging/discharging.
Figure 12:
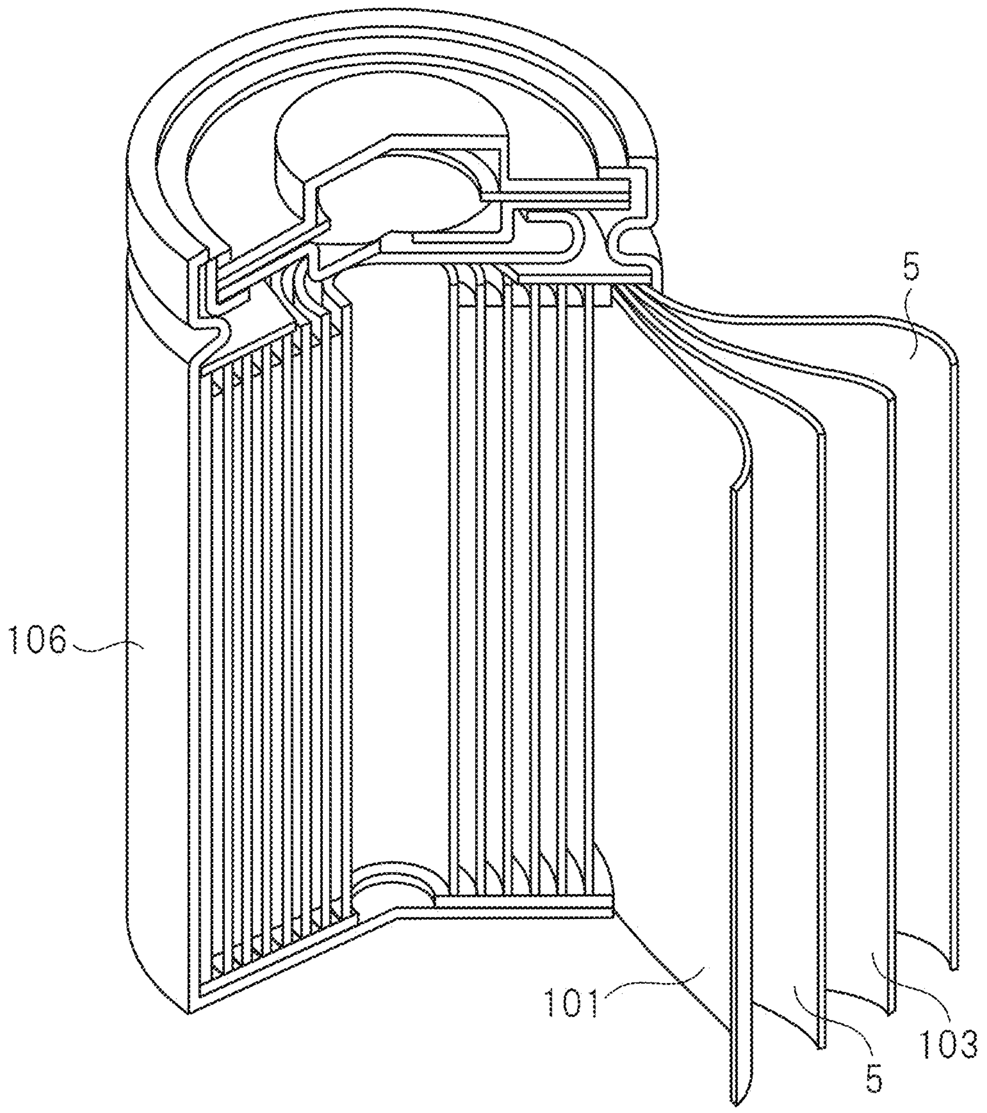
FIG. 12 is a cross-sectional perspective view illustrating a configuration of a lithium ion battery.

FIG. 11 is a view illustrating a relationship between the movement of lithium ions ($Li^+$) and charging/discharging. FIG. 12 is a cross-sectional perspective view illustrating the configuration of the lithium ion battery. The lithium ion battery illustrated in FIG. 12 includes a cylindrical can 106, and this can 106 houses an electrode group in which the belt shaped positive electrode member 101 and negative electrode member 103 are wound to sandwich the coat body (separator) 5. The positive electrode current collecting tab on the upper end surface of the electrode group is joined to the positive electrode cap. The negative electrode current collecting tab on the lower end surface of the electrode group is joined to the bottom portion of the can 106. Note that an insulation covering (not illustrated) is provided on the outer peripheral surface of the can 106. Furthermore, electrolytic solution (not illustrated) is injected into the can 106. Note that the cylindrical battery has been exemplarily described here. However, the configuration of the battery is not limited, and for example, may be square or laminate type battery.

Thus, the lithium ion battery includes the positive electrode member 101, the negative electrode member 103, the coat body (separator) 5 and the electrolytic solution, and the coat body (separator) 5 is arranged between the positive electrode member 101 and the negative electrode member 103. The coat body (separator) 5 has a large number of fine pores. For example, at the time of charging, that is, when the charger is connected between the positive electrode (positive electrode cap) and the negative electrode (bottom portion of the can 106), the lithium ions inserted in the positive electrode active material are desorbed, and are released into the electrolytic solution. The lithium ions released into the electrolytic solution move through the electrolytic solution, pass through the fine pores of the separator, and reach the negative electrode. The lithium ions that have reached the negative electrode are inserted into the negative electrode active material configuring the negative electrode.

Thus, the charging and the discharging can be repeated when the lithium ions move forward and backward between the positive electrode member and the negative electrode member (between the electrodes E1, E2) through the fine pores (not illustrated) formed in the coat body (separator) 5 (see also FIG. 11). In particular, when the film thickness of the coat body (separator) 5 illustrated in FIG. 11 is large, the resistance of the lithium ion at the time of passing the film increases, and the battery output property decreases. Furthermore, the movement amount of the lithium ions decreases, and thus the movement amount of the electrons also decreases, and the battery capacity decreases. On the other hand, by using the spray coating apparatus that utilizes the electro-spraying phenomenon as the post-stage coating apparatus described in the first embodiment and the like, even a very thin film (e.g., film having a film thickness of about 0.01 to 10 μm) can be uniformly formed with satisfactory controllability, and the battery properties (output property, capacity, etc.) can be enhanced.

Next, a method of manufacturing the base member (porous film) on which the coat liquid is applied will be described. The base member (porous film) can be manufactured by, for example, the following steps.

Figure 13:
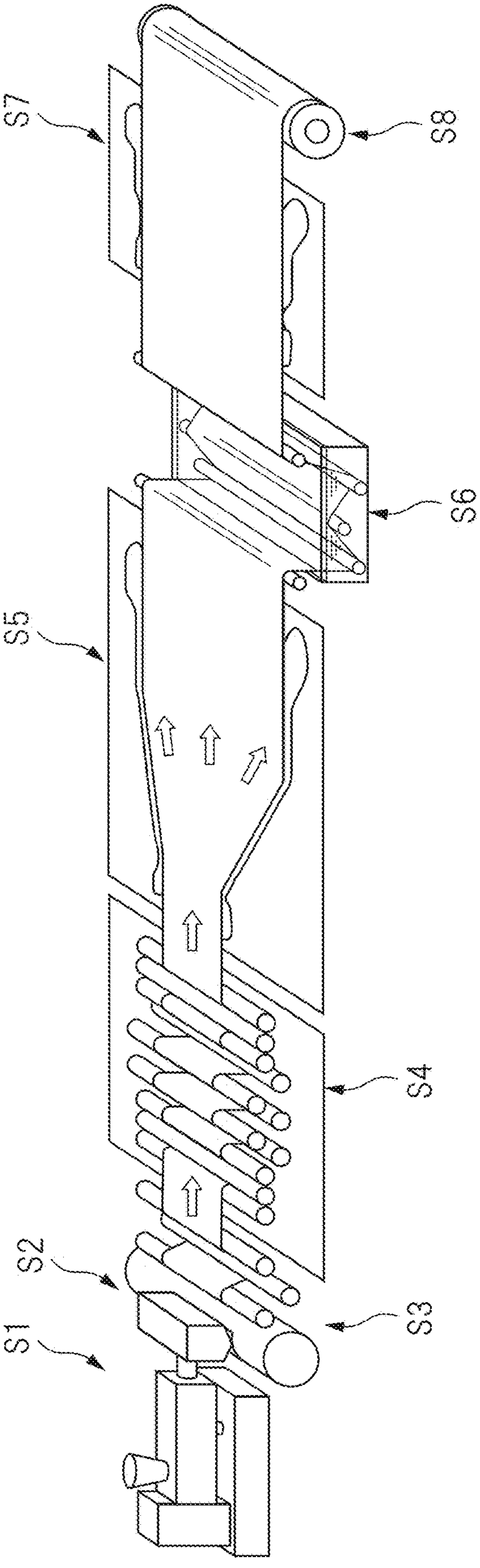
FIG. 13 is a schematic view illustrating a configuration of an apparatus (system) of manufacturing a porous film.

FIG. 13 is a schematic view illustrating a configuration of an apparatus (system) of manufacturing the porous film. For example, a plasticizer (liquid paraffin) and polyolefin (e.g., polyethylene) are input to a raw material supply unit of a twin-screw kneader/extruder (S1) of FIG. 13, and the plasticizer and the polyolefin are kneaded in the kneading unit. The kneading conditions are, for example, 180° for 12 minutes, and the rotation number of the shaft is 100 rpm.

The kneaded material (molten resin) is conveyed from an ejection unit to a T die S2, and the molten resin is cooled in a raw-fabric cooling apparatus S3 while being extruded from the slit of the T die S2 to form a thin-film resin molded body.

Next, the thin-film resin molded body is stretched in a longitudinal direction by a first stretcher S4, and is further stretched in a transverse direction by a second stretcher S5.

Next, the stretched thin film is soaked in an organic solvent (e.g., methylene chloride) in an extraction bath S6. In the stretched thin film, the polyolefin (e.g., polyethylene) and the plasticizer (paraffin) are in a phase separated state. Specifically, the plasticizer (paraffin) is in a nano-sized island shape. The nano-sized plasticizer (paraffin) is removed (degreased) by the organic solvent (e.g., methylene chloride) of the extraction bath S6. In this manner, the porous film is formed.

Then, the thin film is dried while being stretched in the transverse direction by a third stretcher S7, and heat fixation is performed to moderate the internal stress at the time of extending. Next, the porous film conveyed from the third stretcher S7 is wound by a winder S8.

The porous film (base member of the first embodiment) can be manufactured as described above.

For example, the wound-form porous film wound by the winder S8 is set in the unwinder UW of the first embodiment (FIG. 2), and the first coat liquid layer 3*a* and the second coat liquid layer 4*a* can be sequentially formed on the surface thereof.

Furthermore, the apparatus of the first embodiment (FIG. 2) may be set between, for example, the third stretcher S7 and the winder S8. In other words, the first coat liquid layer 3*a* and the second coat liquid layer 4*a* may be sequentially formed on the surface of the porous film conveyed from the third stretcher S7. In this case, the winder S8 corresponds to the winder WD of FIG. 2.

As described above, the coat body may be formed by the apparatuses (system) continuing from the formation of the porous film to the formation of the coat layer.

Fourth Embodiment

Figure 14:
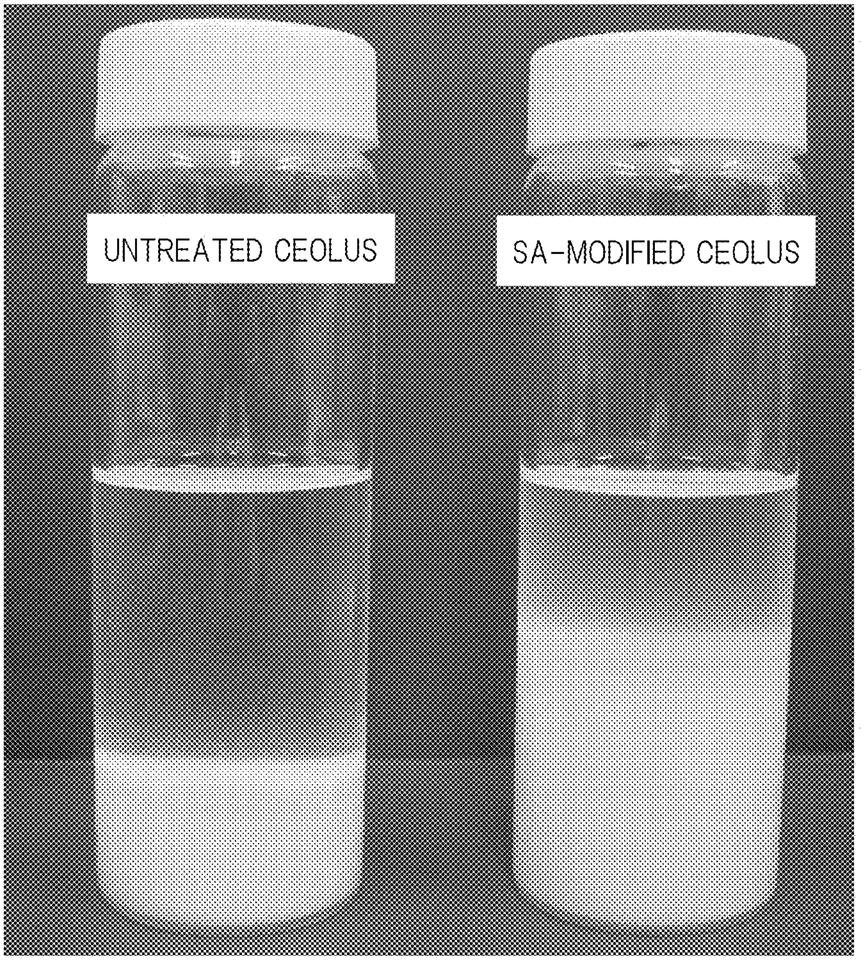
FIG. 14 is a view illustrating a precipitated state of cellulose (Ceolus) of a fourth embodiment.

FIG. 14 is a view illustrating a precipitated state of the cellulose (Ceolus) of a fourth embodiment. A cellulose single body (untreated cellulose) and a cellulose including a chemically-altered (semi-esterification (SA) modified) hydrophobic group on the cellulose surface were added with the same amount to water, and were left to stand for 24 hours (FIG. 14). The added amount is 10 g. The "SA modification" means that an additive agent (succinic anhydride) unreacted after the esterification of the cellulose with the additive agent is removed.

As illustrated in FIG. 14, in the SA-modified cellulose after the elapse of 24 hours, the extent of precipitation is less than that of the untreated cellulose. It is considered this is because of the electrostatic repulsion effect caused by the hydrophobic group modified on the cellulose molecular surface. Therefore, when such a semi-esterified cellulose is added into liquid to be atomized on the atomization area AS, the electrostatic repulsion force on the liquid surface is further increased, and finer liquid droplets can be ejected from the tip of the Taylor cone.

Thus, by the chemical modification treatment on the surface of the filler such as the cellulose, the electrostatic repulsion action of the filler can be enhanced, and the finer liquid droplets can be applied.

Fifth Embodiment

Figure 15:
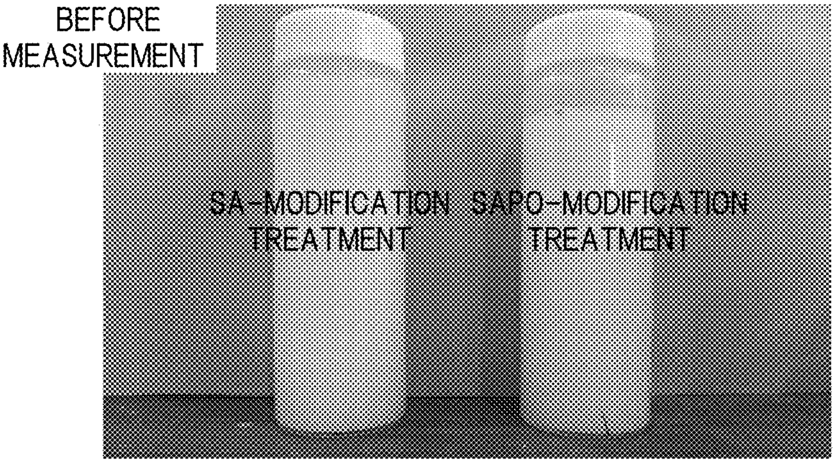
FIG. 15 is a view illustrating a precipitated state of cellulose of a fifth embodiment.
Figure 16:
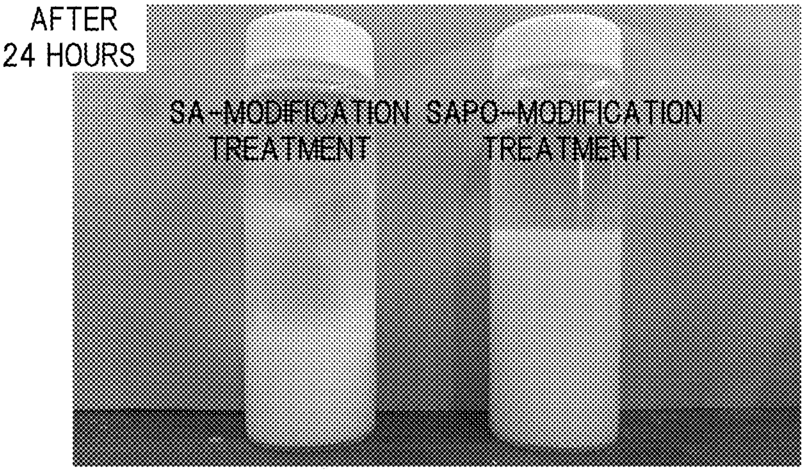
FIG. 16 is a view illustrating a precipitated state of cellulose of the fifth embodiment.

FIGS. 15 and 16 are views each illustrating a precipitated state of a cellulose of a fifth embodiment. A cellulose including a chemically-altered (semi-esterification (SA) modified) hydrophobic group on the cellulose surface or a cellulose including a secondarily chemically altered (SAPO modified) hydrophobic group of the SA cellulose with propylene oxide were respectively added with the same amount into water. The state immediately after the addition is illustrated in FIG. 15. The state after elapse of 24 hours is illustrated in FIG. 16. As illustrated in FIG. 16, in comparison between the precipitation states after the elapse of 24 hours from the addition of the SA-modified cellulose or the SAPO-modified cellulose, it is confirmed that the precipitation in the SAPO modification case is suppressed than that in the SA modification case. It is considered that this is because the increase in the amount of the hydrophobic group modified on the cellulose molecular surface further enhances the electrostatic repulsion action than that in the SA modification case. Therefore, when not only the SA-modified cellulose described in the fourth embodiment but also the SAPO-modified cellulose are added into the liquid to be atomized on the atomization area AS, the electrostatic repulsion action on the liquid surface is extremely enhanced, and thus finer liquid droplets can be ejected from the tip of the Taylor cone.

Thus, by the chemical modification treatment on the surface of the filler such as cellulose, the electrostatic repulsion action of the filler can be enhanced, and finer liquid droplets can be applied.

In the foregoing, the invention made by the inventors of the present application has been concretely described on the basis of the embodiments and examples. However, it is needless to say that the present invention is not limited to the foregoing embodiments, and various modifications can be made within the scope of the present invention.

For example, in the first embodiment, a separator including a coat layer (coat film 3*b* and coat film 4*b*) on a base member made of a porous film has been exemplarily described. However, for example, a coating technique described in the first embodiment and the like may be applied to an electrode including the coat layer on a metal foil which is the base member.

For example, for the first coat liquid, black lead and nano-Si serving as a negative electrode active material may be added to first mixed liquid which is mixture of hydrophobic cellulose nanofiber (CeNF) dispersed in water and organic solvent, and furthermore, second mixed liquid to which, for example, carbon nano tube (CNT) or acetylene black are added as a conductive material may be further used. For the negative electrode active material, not nano-Si but a widely-used material such as graphite (black lead), hard carbon (non-graphitizable carbon), soft carbon (highly graphitizable carbon), lithium titanate ($Li_4Ti_5O_{12}$) or the like may be used. Furthermore, Ketjen black, carbon nano-fiber, or the like may be used as a conductive member other than the CNT and the acetylene black. The first coat liquid layer 3*a* and the second coat liquid layer 4*a* may be formed as described above on the metal foil by using the coat liquid described above for the second coat liquid, and may be dried by the heater 10 or the like to form the stacked film (negative electrode) of the coat film 3*b* and the coat film 4*b*.

Furthermore, for the first coat liquid, in a third mixed solution which is mixture of hydrophobic cellulose nano fiber (CeNF) dispersed in water and organic solvent, mixed slurry obtained by suspending the conductive member and the binder such as PVDF and a positive electrode active material such as NCM, NCA, $LiNiO_2$, $Li_2MnO_3$—$LiMO_2$, $Li_2MSiO_4$, and the like may be used. The first coat liquid layer 3*a* and the second coat liquid layer 4*a* may be formed as described above on the metal foil by using the coat liquid described above for the second coat liquid, and may be dried by the heater 10 or the like to form the stacked film (positive electrode) of the coat film 3*b* and the coat film 4*b*.

The first coat liquid and the second coat liquid including the electrode active material may be sequentially applied onto the metal foil as described in the embodiments described above.

Furthermore, the number of the coat layers on the base member may be two or more. In other words, the effects described in the first embodiment and the like can be obtained by the spray coating which is the non-contact coating process described in the first embodiment and the like when the coat layer serving as an upper layer is formed in a state in which the coat layer serving as a lower layer is already formed on the base member. For example, a coat film may be further provided on the coat film 3*b* and the coat film 4*b* by the spray coating which is the non-contact coating process.

In addition, as a method of forming the coat layer (e.g., coat film 3*b*) serving as the lower layer, not the gravure coating which is the contact coating process but coating using a bar coater may be used. Furthermore, die coater type coating may be used. Thus, the method for forming the coat layer serving as the lower layer (e.g., coat film 3*b*) may be the contact coating or the non-contact coating. For example, a three-layered coat film may be formed by "contact coating→non-contact coating→non-contact coating". Alternatively, the three-layered coat film may be formed by "non-contact coating→non-contact coating→non-contact coating".

Explanation Of Reference Characters

1 base member
3*a* first coat liquid layer
3*b* coat film
4*a* second coat liquid layer
4*b* coat film
5 coat body
10 heater
20 first coating processing unit
20*a* coat liquid
20A gravure coating unit
20*b* chamber (bath)
20B gravure coating unit
20*c* blade
30 second coating processing unit
40 dryer
90 rotary disc
101 positive electrode member
103 negative electrode member
106 can

The invention claimed is:

1. An apparatus of manufacturing a coat body comprising:
a carry-out unit configured to load out a base member;
a first coating unit configured to apply a first coat liquid onto a first surface of the base member;
a second coating unit configured to apply a second coat liquid onto the first surface of the base member;
a dryer configured to form a coat body on the first surface of the base member by drying the first coat liquid and the second coat liquid on the base member; and
a carry-in unit configured to load in the base member including the coat body formed thereon,
wherein the first coating unit applies the first coat liquid onto the first surface of the base member, and
the second coating unit atomizes the second coat liquid onto the first surface of the base member,
wherein the second coating unit includes:
a first chamber in which a nozzle for atomizing the second coat liquid is arranged;
a second chamber in which an air nozzle is disposed; and
a third chamber in which another air nozzle is disposed, wherein
the second chamber is disposed between the first chamber and the carry-in unit;
the third chamber is disposed between the carry-out unit and the first chamber,
each of the first, second, and third chambers including an inlet through which the base member enters the chamber and an outlet through which the base member exits the chamber as it is conveyed from the carry-out unit to the carry-in unit, the air nozzle in the second chamber is disposed so as to be inclined relative to a direction perpendicular to the base member, and positioned so as to spray air directly at the outlet of the first chamber to form an air curtain at the inlet of the second chamber and suppress leakage of the second coat liquid from the first chamber into the second chamber, and the air nozzle in the third chamber is disposed so as to be inclined relative to the direction perpendicular to the base member, and positioned so as to spray air directly at the inlet of the first chamber to form an air curtain at the outlet of the third chamber and suppress leakage of the second coat liquid from the first chamber into the third chamber, wherein an air spray angle of the air nozzle in the second chamber is larger than an air spray angle of the air nozzle in the third chamber.

2. The apparatus of manufacturing the coat body according to claim 1, wherein a voltage that is equal to or larger than 1 kV is applied between the nozzle and the base member.

3. The apparatus of manufacturing the coat body according to claim 1, wherein an inclination angle of the air nozzle in the second chamber is equal to or larger than 0.1°.

4. The apparatus of manufacturing the coat body according to claim 1, wherein the first coat liquid includes a first filler and a second filer, the first filler is a material selected from alumina, silica, aluminum hydroxide, and boehmite, and the second filler is a material selected from cellulose, carbon nano fiber, carbon nano tube, cellulose nano fiber, graphene, and fullerene.

5. The apparatus of manufacturing the coat body according to claim 4, wherein chemical denaturation treatment is performed to a surface of the second filler.

6. The apparatus of manufacturing the coat body according to claim 1, wherein the first coat liquid contains an electrode active material, and the second coat liquid contains alkali silicate.

7. The apparatus of manufacturing the coat body according to claim 1, wherein an inclination angle of the air nozzle in the third chamber is equal to or larger than 0.1°.

* * * * *